US012583433B2

(12) United States Patent (10) Patent No.: US 12,583,433 B2
Omikawa (45) Date of Patent: Mar. 24, 2026

(54) DRIVER ASSISTANCE APPARATUS FOR VEHICLE

(71) Applicant: SUBARU CORPORATION, Tokyo (JP)

(72) Inventor: Takashi Omikawa, Tokyo (JP)

(73) Assignee: SUBARU CORPORATION, Tokyo (JP)

( * ) Notice: Subject to any disclaimer, the term of this patent is extended or adjusted under 35 U.S.C. 154(b) by 52 days.

(21) Appl. No.: 18/903,153

(22) Filed: Oct. 1, 2024

(65) Prior Publication Data

US 2025/0121813 A1 Apr. 17, 2025

(30) Foreign Application Priority Data

Oct. 11, 2023 (JP) .................................. 2023-175745

(51) Int. Cl.
*B60W 10/20* (2006.01)
*B62D 5/04* (2006.01)
*B62D 15/02* (2006.01)
*G06V 20/56* (2022.01)
*B60W 50/00* (2006.01)

(52) U.S. Cl.
CPC ......... *B60W 10/20* (2013.01); *B62D 15/0245* (2013.01); *B62D 15/025* (2013.01); *G06V 20/56* (2022.01); *B60W 2050/0086* (2013.01); *B60W 2520/10* (2013.01); *B60W 2540/18* (2013.01); *B60W 2710/207* (2013.01)

(58) Field of Classification Search
CPC ......... B60W 10/20; B60W 2050/0086; B60W 2520/10; B60W 2540/18; B60W 2710/207; G06V 20/56; B62D 15/025; B62D 5/0466; B62D 15/0245
See application file for complete search history.

(56) References Cited

U.S. PATENT DOCUMENTS

2015/0274206 A1* 10/2015 Takeda ................... B62D 6/008
                                                                701/41
2019/0351941 A1* 11/2019 Uematsu .................. B62D 6/02
2022/0097758 A1* 3/2022 Kasai ..................... B62D 6/008

FOREIGN PATENT DOCUMENTS

JP          2018-075946 A     5/2018

* cited by examiner

*Primary Examiner* — Jacob M Amick
(74) *Attorney, Agent, or Firm* — Rimon P.C.

(57) ABSTRACT

A driver assistance apparatus includes a neutral point learning calculator. The neutral point learning calculator sets a neutral point learning correction value by which a neutral point of a steering angle instruction value is to be corrected. The neutral point learning calculator includes: a first estimated lateral acceleration calculator that calculates a first estimated lateral acceleration based on a steering angle and a vehicle speed; a second estimated lateral acceleration calculator that calculates a second estimated lateral acceleration, based on the vehicle speed and a lane curvature; a lateral acceleration difference calculator that calculates a lateral acceleration difference based on a difference between the first and the second estimated lateral accelerations; a steering angle difference calculator that calculates a steering angle difference, based on the lateral acceleration difference; and a neutral point learning correction value setter that sets the steering angle difference to the neutral point learning correction value.

6 Claims, 8 Drawing Sheets

NEUTRAL POINT
($\beta = 0$[rad])

M

CURVED ROAD

LANE CURVATURE
($1/R = 0$)

$(m \cdot G)\sin \theta s$ $m \cdot G$ $\theta s$

M

Ff $\theta s$

DRIVER ASSISTANCE APPARATUS FOR VEHICLE

CROSS-REFERENCE TO RELATED APPLICATIONS

The present application claims priority from Japanese Patent Application No. 2023-175745 filed on Oct. 11, 2023, the entire contents of which are hereby incorporated by reference.

BACKGROUND

The disclosure relates to a driver assistance apparatus for a vehicle.

In a vehicle such as an automobile, a driver assistance apparatus configured to assist a driving operation of a driver who drives the vehicle has recently brought into practical use in order to reduce a load on the driving operation of the driver and to improve safety. An automatic steering control is one of such driver assistance operations. Known examples of the automatic steering control include a lane departure prevention (LDP) control and an active lane keeping (ALK) control. In the automatic steering control such as the LDP control or the ALK control, respective lane lines that define, in a left-right direction, a lane on which an own vehicle travels are recognized by a front recognition sensor such as a stereo camera, and a steering control is performed to allow the own vehicle to travel along the lane without departing from the recognized lane lines.

In the automatic steering control, a steering device is driven to allow the own vehicle to travel along the lane. Further, a steering angle of the steering device is detected by a steering angle sensor, and a feedback control is performed to allow the steering angle to converge to a target steering angle.

In the feedback control of the steering angle, deviation of a neutral point of the steering angle can cause deviation of a value detected by the steering angle sensor from an actual steering angle. This can result in setting of a feedback control amount that makes the steering angle excessively large or excessively small with respect to a curvature of a road.

To address this, the neutral point of the steering angle sensor is to be constantly learned. For example, Japanese Unexamined Patent Application Publication (JP-A) No. 2018-075946 discloses a technique in which, when an own vehicle is determined as being traveling straight along a straight road, a steering angle detected by a steering angle sensor upon the determination is learned as the neutral point.

SUMMARY

An aspect of the disclosure provides a driver assistance apparatus for a vehicle. The driver assistance apparatus includes a steering angle detector, a vehicle speed detector, a traveling environment recognizer, a steering driver, a steering assistance controller, and a neutral point learning calculator. The steering angle detector is configured to detect a steering angle of the vehicle. The vehicle speed detector is configured to detect a vehicle speed of the vehicle. The traveling environment recognizer is configured to recognize a traveling environment in front of the vehicle. The steering driver is configured to steer left and right steered wheels of the vehicle. The steering assistance controller is configured to output a steering angle instruction value to the steering driver and allow the vehicle to travel in accordance with a lane curvature recognized by the traveling environment recognizer. The neutral point learning calculator is configured to set a neutral point learning correction value by which a neutral point of the steering angle instruction value is to be corrected. The steering angle instruction value is to be outputted from the steering assistance controller. The neutral point learning calculator includes a first estimated lateral acceleration calculator, a second estimated lateral acceleration calculator, a lateral acceleration difference calculator, a steering angle difference calculator, and a neutral point learning correction value setter. The first estimated lateral acceleration calculator is configured to calculate a first estimated lateral acceleration that is to act on the vehicle, based on the steering angle and the vehicle speed detected by the vehicle speed detector. The second estimated lateral acceleration calculator is configured to calculate a second estimated lateral acceleration that is to act on the vehicle, based on the vehicle speed detected by the vehicle speed detector and the lane curvature recognized by the traveling environment recognizer. The lateral acceleration difference calculator is configured to calculate a lateral acceleration difference, based on a difference between the first estimated lateral acceleration calculated by the first estimated lateral acceleration calculator and the second estimated lateral acceleration calculated by the second estimated lateral acceleration calculator. The steering angle difference calculator is configured to calculate a steering angle difference, based on the lateral acceleration difference calculated by the lateral acceleration difference calculator and the vehicle speed detected by the vehicle speed detector. The neutral point learning correction value setter is configured to set the steering angle difference calculated by the steering angle difference calculator to the neutral point learning correction value.

An aspect of the disclosure provides a driver assistance apparatus for a vehicle. The driver assistance apparatus includes a steering angle detector, a vehicle speed detector, a traveling environment recognizer, a steering driver, and circuitry. The steering angle detector includes a sensor and is configured to detect a steering angle of the vehicle. The vehicle speed detector includes a sensor and is configured to detect a vehicle speed of the vehicle. The traveling environment recognizer includes a camera and is configured to recognize a traveling environment in front of the vehicle. The steering driver includes a motor and is configured to steer left and right steered wheels of the vehicle. The circuitry is configured to perform a steering assistance control in which a steering angle instruction value is outputted to the steering driver and allow the vehicle to travel in accordance with a lane curvature recognized by the traveling environment recognizer. The circuitry is configured to perform a neutral point learning calculation in which a neutral point learning correction value is set. The neutral point learning correction value is a value by which a neutral point of the steering angle instruction value is to be corrected. As the neutral point learning calculation, the circuitry is configured to: calculate a first estimated lateral acceleration that is to act on the vehicle, based on the steering angle and the vehicle speed detected by the vehicle speed detector; calculate a second estimated lateral acceleration that is to act on the vehicle, based on the vehicle speed detected by the vehicle speed detector and the lane curvature recognized by the traveling environment recognizer; calculate a lateral acceleration difference, based on a difference between the first estimated lateral acceleration and the second estimated lateral acceleration; calculate a steering angle difference, based on the lateral acceleration difference and the vehicle speed detected by the vehicle speed detector; and set the steering angle difference to the neutral point learning correction value.

BRIEF DESCRIPTION OF THE DRAWINGS

The accompanying drawings are included to provide a further understanding of the disclosure, and are incorporated in and constitute a part of this specification. The drawings illustrate embodiments and, together with the specification, serve to explain the principles of the disclosure.

DETAILED DESCRIPTION

Figure 1:
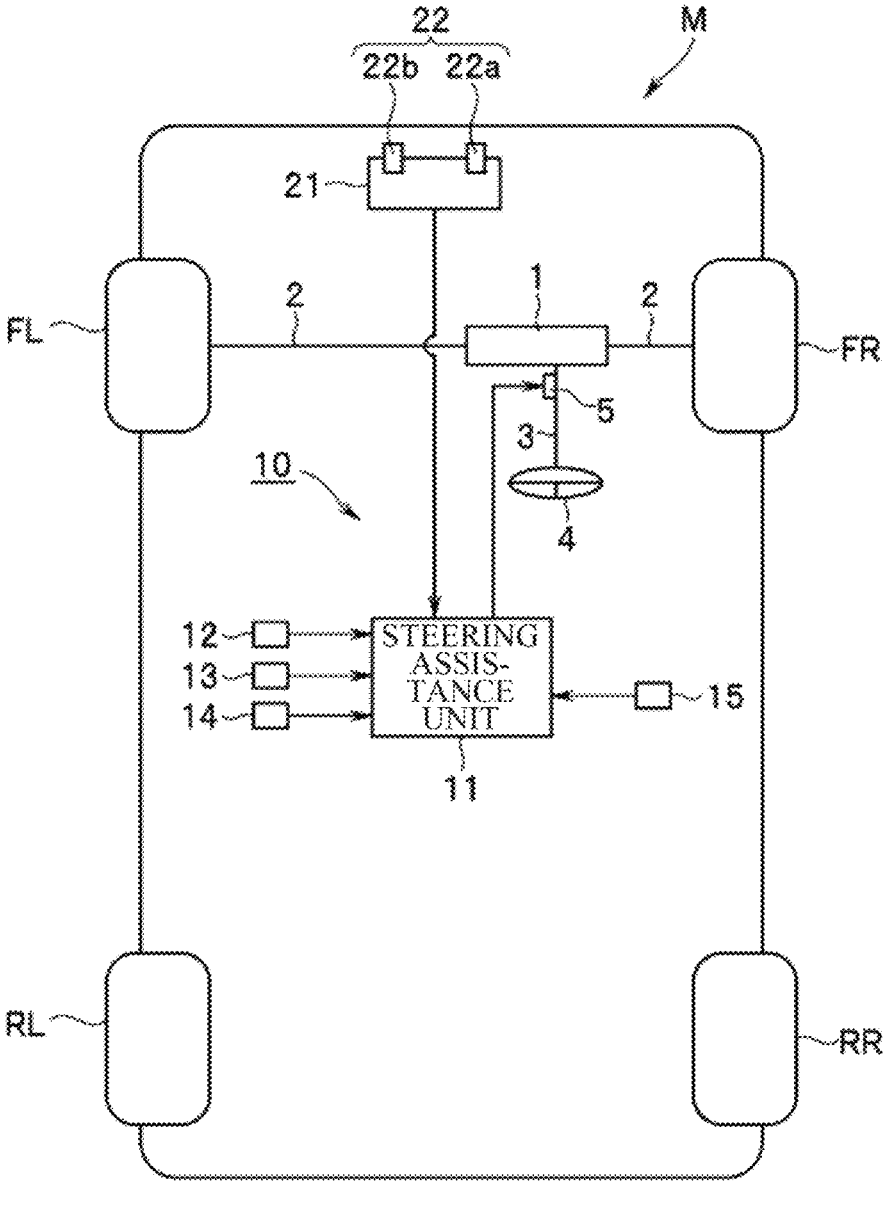
FIG. 1 is a schematic configuration diagram illustrating a part of a vehicle in which a driver assistance apparatus according to one example embodiment of the disclosure is mounted.

An existing driver assistance apparatus controls a steering angle by outputting an instruction steering torque or a target steering torque to an electric motor of an electric power steering (EPS) device. A recent driver assistance apparatus, however, tends to control the electric motor of the EPS device not by the steering torque control but by a steering angle control instead.

Such switching of the control of the electric motor of the EPS device from the steering torque control to the steering angle control improves response. The steering angle control involves an angle control based on a neutral point of the steering angle as a reference. Accordingly, the neutral point of the steering angle is to be learned with high accuracy.

JP-A No. 2018-075946 discloses a technique in which a neutral point of a steering angle is learned simply under a condition that an own vehicle is traveling straight along a straight road. When such a condition is set, if the straight road is short in distance or if a road has continuous curves, the driver assistance apparatus has less opportunities to learn the neutral point of the steering angle, which makes it difficult to achieve highly accurate learning of the neutral point.

Accordingly, when the driver assistance apparatus executes a lane departure prevention (LDP) control, deviation of the neutral point of the steering angle can result in a difference between left and right in maximum amount of a difference between a detected steering angle and a target steering angle or in maximum amount of control to be performed to allow the steering angle to converge to the target steering angle when the own vehicle deviates from any of left and right lane lines. When the driver assistance apparatus executes an active lane keeping (ALK) control, the deviation of the neutral point of the steering angle can result in an issue of a difference between left and right in convergence of a feedback control that allows the own vehicle to travel along a target traveling path.

The driver assistance apparatus executes a control such as the LDP control or the ALK control described above not only on the straight road but also on a curved road. In the technique disclosed in JP-A No. 2018-075946, the neutral point of the steering angle is not learned when the own vehicle is traveling on the curved road, which can result in degraded control performance of the control such as the LDP control or the ALK control.

It is desirable to provide a driver assistance apparatus for a vehicle, that makes it possible to reduce a time of convergence in a feedback control to allow the own vehicle to travel along a target traveling path.

In the following, some example embodiments of the disclosure are described in detail with reference to the accompanying drawings. Note that the following description is directed to illustrative examples of the disclosure and not to be construed as limiting to the disclosure. Factors including, without limitation, numerical values, shapes, materials, components, positions of the components, and how the components are coupled to each other are illustrative only and not to be construed as limiting to the disclosure. Further, elements in the following example embodiments which are not recited in a most-generic independent claim of the disclosure are optional and may be provided on an as-needed basis. The drawings are schematic and are not intended to be drawn to scale. Throughout the present specification and the drawings, elements having substantially the same function and configuration are denoted with the same reference numerals to avoid any redundant description. In addition, elements that are not directly related to any embodiment of the disclosure are unillustrated in the drawings.

In FIG. 1, a vehicle, i.e., an own vehicle M, may include a left front wheel FL, a right front wheel FR, a left rear wheel RL, and a right rear wheel RR. The left front wheel FL and the right front wheel FR may serve as steered wheels. When the own vehicle M is a four-wheel drive vehicle, each of the left front wheel FL, the right front wheel FR, the left rear wheel RL, and the right rear wheel RR may serve as a driving wheel.

Each of the left front wheel FL and the right front wheel FR may be coupled to a steering mechanism 1 via a tie rod 2. Non-limiting examples of the steering mechanism 1 may include a rack and pinion mechanism. A base of a steering shaft 3 may be coupled to the steering mechanism 1. A steering wheel 4 may be fixed to an end of the steering shaft 3. An electric power steering (EPS) motor 5 may be coupled to the steering shaft 3 via an unillustrated transfer mechanism.

The own vehicle M may be provided with a driver assistance apparatus 10 mounted therein. The driver assistance apparatus 10 may include a steering assistance unit 11. The steering assistance unit 11 and a lane recognizer 24 of a camera unit 21 to be described later may each include, for example but not limited to, a microcontroller including a central processing unit (CPU), a random access memory (RAM), a read-only memory (ROM), a nonvolatile memory such as an electrically erasable programmable read-only memory (EEPROM), and other peripheral devices. The RAM may serve as a work area of the CPU, and may temporarily hold various kinds of data to be used by the CPU. The ROM may hold, for example but not limited to, programs and fixed data that allow for the CPU to execute various processes. Note that the CPU may also be referred to as a microprocessor (MPU) or a processor. In some embodiments, a graphics processing unit (GPU) or a graph streaming processor (GSP) may be used instead of the CPU. In some embodiments, a selective combination of any of the CPU, the GPU, and the GSP may be used.

The steering assistance unit 11 may execute a steering assistance control based on the program stored in the ROM. The steering assistance control may include, for example but not limited to, a lane departure prevention (LDP) control and an active lane keeping (ALK) control.

Coupled to an input side of the steering assistance unit 11 may be a lateral acceleration sensor 12, a vehicle speed sensor 13, a yaw rate sensor 14, and a steering angle sensor 15. In one embodiment, the lateral acceleration sensor 12 may serve as a "lateral acceleration detector". In one embodiment, the vehicle speed sensor 13 may serve as a "vehicle speed detector". In one embodiment, the yaw rate sensor 14 may serve as a "yaw rate detector". In one embodiment, the steering angle sensor 15 may serve as a "steering angle detector". The lateral acceleration sensor 12 may detect a lateral acceleration ay when the own vehicle M travels on a road such as a curved road. The vehicle speed sensor 13 may detect a vehicle speed of the own vehicle M, i.e., an own vehicle speed V. The yaw rate sensor 14 may detect a yaw rate γ of a vehicle body of the own vehicle M. The steering angle sensor 15 may detect a steering angle β (rad) from a rotation angle of the steering shaft 3. Further, the EPS motor 5 may be coupled to an output side of the steering assistance unit 11. In one embodiment, the EPS motor 5 may serve as a "steering driver".

Figures 2, 3:
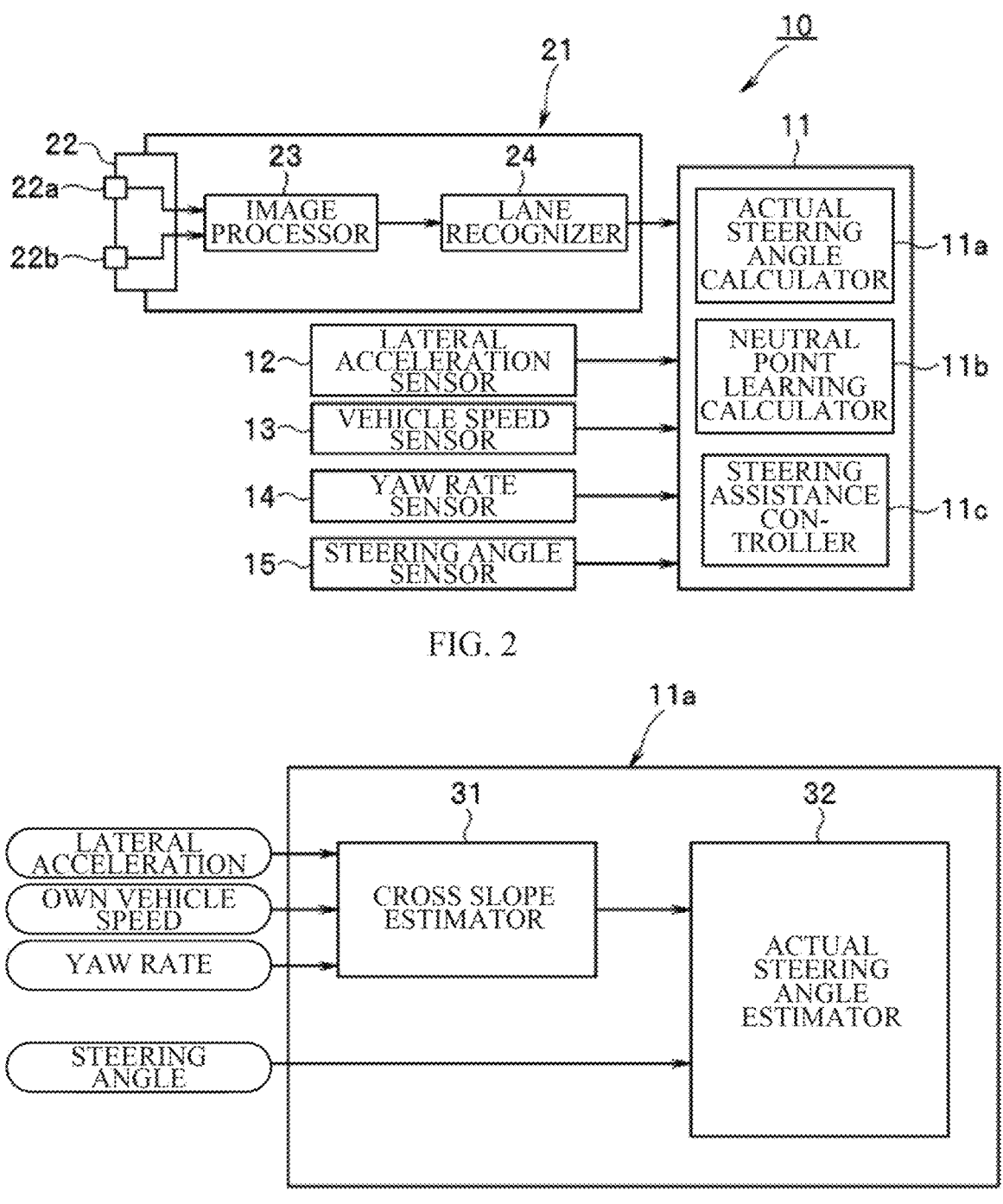
FIG. 2 is a block diagram illustrating a camera unit and a steering assistance unit.
FIG. 3 is a block diagram illustrating an actual steering angle calculator.

The camera unit 21 may also be coupled to the input side of the steering assistance unit 11. In one embodiment, the camera unit 21 may serve as a "traveling environment recognizer". As illustrated in FIG. 2, the camera unit 21 may include an in-vehicle camera 22, and may also include an image processor 23 and a lane recognizer 24 that are built in the camera unit 21. The in-vehicle camera 22 may include a stereo camera including a main camera 22a and a sub-camera 22b. The main camera 22a and the sub-camera 22b may be fixed with a predetermined baseline length. The main camera 22a and the sub-camera 22b may be disposed, for example, substantially horizontally at respective positions that are above an inside rear-view mirror in a front part of an inside of the own vehicle M, in proximity to a windshield, and substantially equally distanced to left and right from a middle in a vehicle width direction.

The main camera 22a and the sub-camera 22b may each include a color imaging device including, for example but not limited to, a color charged coupled device (CCD) or a color complementary metal oxide semiconductor (CMOS) mounted therein. The respective color imaging devices provided in the main camera 22a and the sub-camera 22b may capture a three-dimensional color image of a traveling environment in a front region in a traveling direction. The traveling environment may include, for example but not limited to, a lane on which the own vehicle M is traveling, i.e., a traveling lane, and left and right lane lines defining the traveling lane. The image processor 23 may convert a pair of analog images captured by the main camera 22a and the sub-camera 22b into digital images each having a predetermined luminance gradation. The image processor 23 may generate reference image data from an output signal supplied from the main camera 22a. The image processor 23 may generate comparison image data from an output signal supplied from the sub-camera 22b. The image processor 23 may acquire distance data of an identical target, i.e., a distance from the own vehicle M to the identical target, in the reference image data and the comparison image data based on a parallax between the reference image data and the comparison image data.

The lane recognizer 24 may respectively set a left lane line and a right lane line on the left and the right of the middle in the vehicle width direction of the own vehicle M on a virtual road plane. The left lane line and the right lane line may define the traveling lane in a left-right direction. The left lane line and the right lane line may be recognized by a method such as pattern matching. The virtual road plane may be generated based on the reference image data and the comparison image data supplied from the image processor 23. Further, the lane recognizer 24 may detect a distance from an inner edge of the left lane line to an inner edge of the right lane line, i.e., a lane width, based on the distance data.

Such lane information including, for example but not limited to, information related to a distance from each of the left and right lane lines to the own vehicle M and information related to the lane width may be read by the steering assistance unit 11.

The steering assistance unit 11 may recognize a curvature (a lane curvature) 1/R1 in a middle of a lane width direction of the traveling lane based on the lane information supplied from the lane recognizer 24, set a target traveling path in accordance with the lane curvature 1/R1, and perform a steering control to allow the own vehicle M to travel along the target traveling path. Note that when the traveling lane is straight, the lane curvature 1/R1 may be 0 (zero).

When executing the steering control, the steering assistance unit 11 may set a position of the steering shaft 3 in a state where the own vehicle M is traveling straight to a neutral point (β=0 (rad)), and may set the steering angle β based on the neutral point as a reference. The steering angle sensor 15 may detect the steering angle β based on the neutral point as the reference. Accordingly, deviation of the neutral point can easily cause great deviation of a traveling locus of the own vehicle M from the target traveling path, which can result in degraded convergence of the feedback control.

For example, the steering assistance unit 11 may execute the steering control not only on a straight road but also on a curved road. Therefore, the neutral point that serves as the reference for the steering angle β is to be substantially constantly learned also when the own vehicle M is traveling on the curved road.

Figure 5:
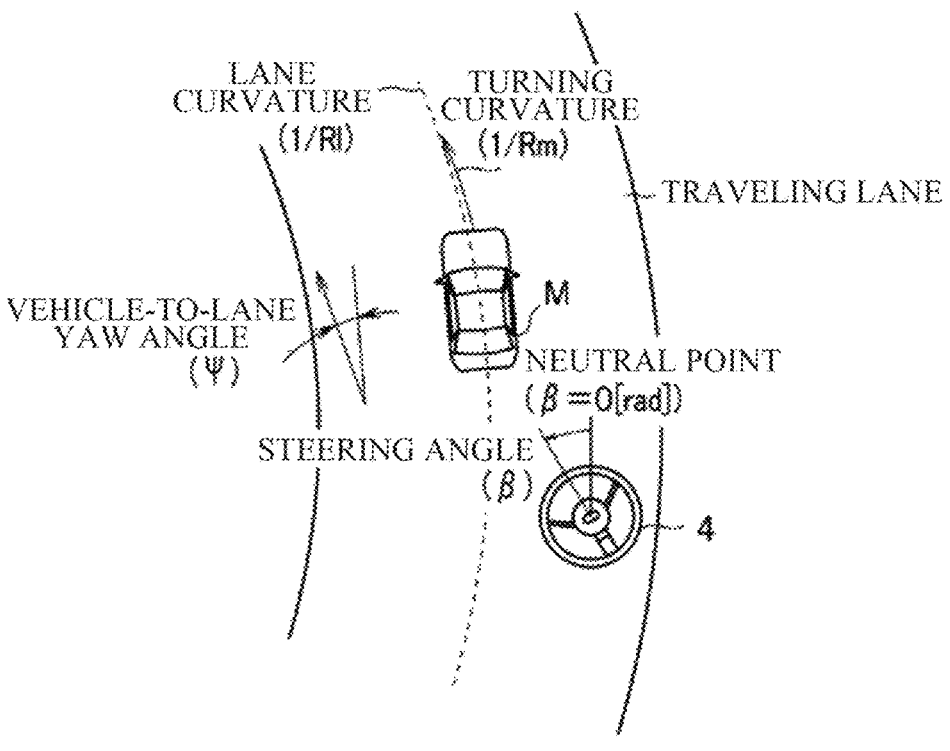
FIG. 5 is an explanatory diagram illustrating a relationship between a vehicle-to-lane yaw angle and a steering angle with respect to a lane curvature.

The steering assistance unit 11 may substantially constantly learn the neutral point serving as the reference for the steering angle β, regardless of whether the own vehicle M is traveling on the straight road or the curved road. The steering assistance unit 11 may estimate lateral accelerations based on two respective basic parameters that are different from each other. The steering assistance unit 11 may estimate the neutral point of the steering angle based on a difference between the two estimated lateral accelerations. The two parameters that are different from each other may be the steering angle β detected by the steering angle sensor 15 and the lane curvature 1/R1 recognized by the camera unit 21 (see FIG. 5). The steering assistance unit 11 may estimate the neutral point of the steering angle from a difference between the lateral acceleration calculated based on the steering angle β and the lateral acceleration calculated based on the lane curvature 1/R1.

As illustrated in FIG. 2, the steering assistance unit 11 may include an actual steering angle calculator 11a and a neutral point learning calculator 11b as configurations adapted to estimate the neutral point of the steering angle. The steering assistance unit 11 may further include a steering assistance controller 11c that executes the steering assistance control. The steering assistance controller 11c may drive the EPS motor 5 and cause the EPS motor 5 to execute an appropriate steering control in order to allow the own vehicle M to travel on the traveling lane without departing from the left and right lane lines.

<Actual Steering Angle Calculator 11a>

As illustrated in FIG. 3, in some embodiments, the actual steering angle calculator 11a may include a cross slope estimator 31 and an actual steering angle estimator 32. The actual steering angle calculator 11a may estimate an actual steering angle βr by subtracting a counter steering angle from the steering angle β detected by the steering angle sensor 15. The actual steering angle calculator 11a may include the cross slope estimator 31 and the actual steering angle estimator 32 as configurations adapted to estimate the actual steering angle βr.

Figure 6A:
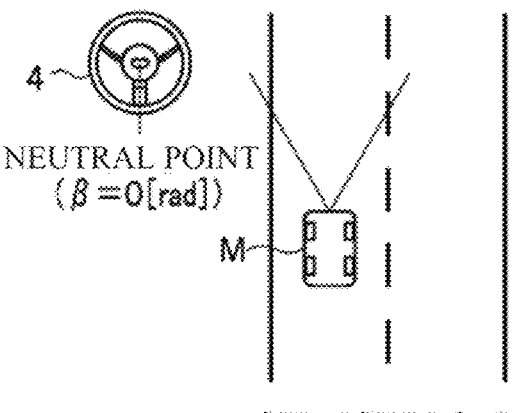
FIG. 6A is an explanatory diagram illustrating a state where an own vehicle is traveling on a straight road.

The cross slope estimator 31 may estimate a cross slope θs (rad) of the lane on which the own vehicle M is traveling. FIG. 6A illustrates a state where the own vehicle M is traveling on a straight road that has a horizontal road surface and is not to be influenced by a disturbance. In the state illustrated in FIG. 6A, if the neutral point of the steering angle sensor 15 is correctly set, the steering angle β detected by the steering angle sensor 15 may be 0 (rad), i.e., the neutral point.

Figure 6B:
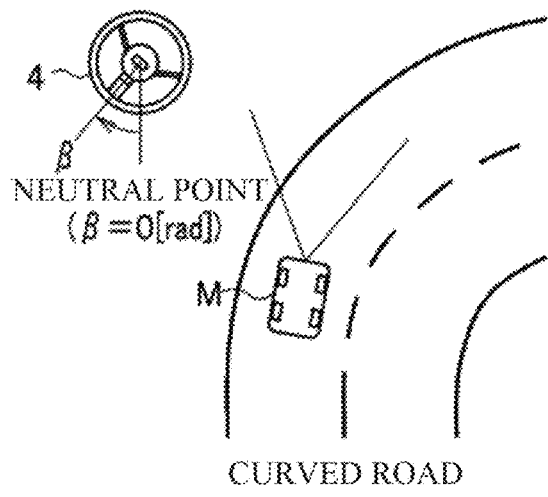
FIG. 6B is an explanatory diagram illustrating a state where the own vehicle is traveling on a curved road.

FIG. 6B illustrates a state where the own vehicle M is traveling on a curved road that has a horizontal road surface and is not to be influenced by a disturbance. In the state illustrated in FIG. 6B, if the neutral point of the steering angle sensor 15 is correctly set, the steering angle β detected by the steering angle sensor 15 may be a steering angle at which the own vehicle M travels along the curved road.

Figure 7:
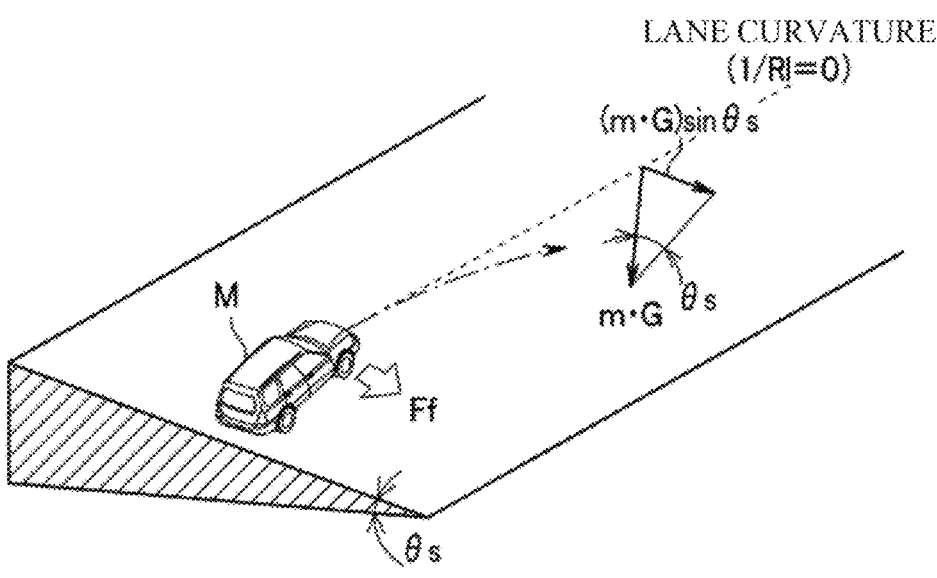
FIG. 7 is an explanatory diagram illustrating behavior of the own vehicle traveling on a straight road having a cross slope.

As illustrated in FIG. 7, when the own vehicle M is traveling on a straight road (1/R1=0) having a cross slope θs, the own vehicle M can be subjected to a vehicle pulling phenomenon as indicated by a dashed-dotted line. In the vehicle pulling phenomenon, the own vehicle M can be drifted downward along an inclined surface. The steering assistance unit 11 may incorporate, into the feedback control, a factor of the counter steering angle that offsets a lateral force Ff acting on the own vehicle M due to the vehicle pulling phenomenon. This helps to allow the own vehicle M to travel along the straight road.

When the own vehicle M is traveling straight on the straight road having the cross slope θs, the steering assistance unit 11 can erroneously determine that a steering angle indication value outputted to the EPS motor 5 represents the neutral point, and can correct the steering angle β detected by the steering angle sensor 15, based on the erroneous determination. This can result in deviation of the neutral point when the own vehicle M is traveling on a flat road having a cross slope θs of substantially 0 (deg).

The cross slope estimator 31 may estimate the cross slope θs of the traveling lane. As illustrated in FIG. 7, in some embodiments, the cross slope θs (rad) may be calculated by the following expression (1).

$$\theta s = \sin\left[(V \cdot \gamma - \alpha y)/G\right]^{-1} \quad (1)$$

In the expression (1), V may be the own vehicle speed detected by the vehicle speed sensor 13, γ may be the yaw rate detected by the yaw rate sensor 14, ay may be the lateral acceleration detected by the lateral acceleration sensor 12, and G may be a gravitational acceleration. Note that a disturbance acting on the own vehicle M may be calculated from the cross slope θs (=m·G sin θs).

The cross slope θs calculated by the cross slope estimator 31 may be read by the actual steering angle estimator 32. The actual steering angle estimator 32 may subtract a cross slope component from the steering angle β detected by the steering angle sensor 15, based on the cross slope θs determined by the cross slope estimator 31. For example, when the own vehicle M is traveling on a road surface having the cross slope θs, the steering assistance unit 11 may incorporate, into the feedback control, a factor of a counter steering angle βan against the cross slope θs to allow the own vehicle M to travel along the traveling lane. Accordingly, the actual steering angle estimator 32 may first determine the counter steering angle βan, and may determine the actual steering angle βr resulting from subtracting the determined counter steering angle βan from the steering angle β detected by the steering angle sensor 15.

Figure 8:
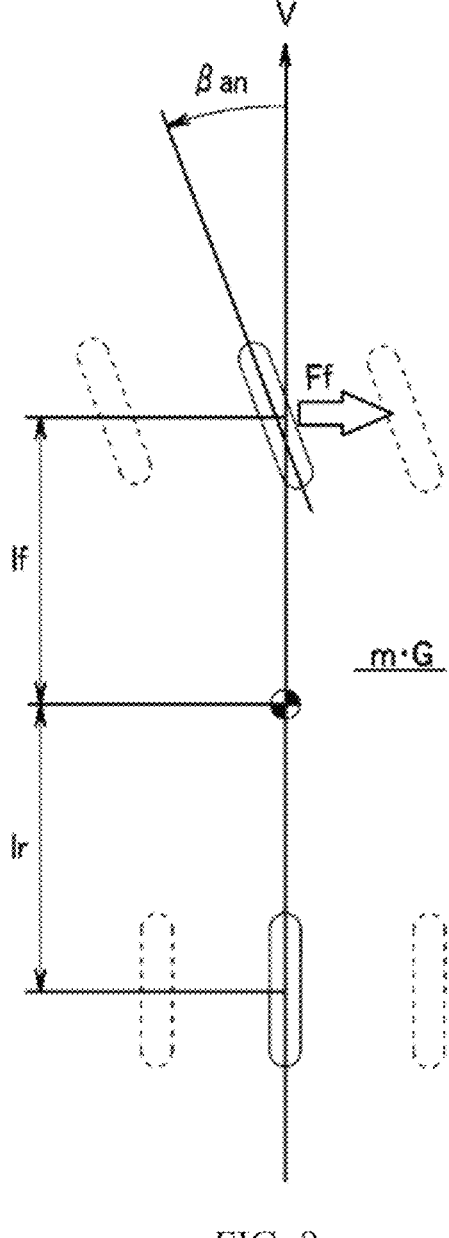
FIG. 8 is an explanatory diagram illustrating a two-wheel model.

FIG. 8 illustrates a two-wheel model typically used as a vehicle motion model. When the own vehicle M is traveling on the road surface having the cross slope θs, a lateral force Ff acting on each of the left front wheel FL and the right front wheel FR may be expressed as the following expression (2)

$$2Ff = -lr/(lf + lr)m \cdot G\sin\theta s \quad (2)$$

In the expression (2), lr may be a distance from a center of gravity of the own vehicle M to a rear wheel shaft, and lf may be a distance from the center of gravity of the own vehicle M to a front wheel shaft.

The counter steering angle βan may be addressed to offset the lateral force 2Ff and to allow the own vehicle M to travel straight. In the present example embodiment, a correlation between the counter steering angle βan and the lateral force 2Ff may be determined in advance for each vehicle model by a method such as a simulation. A map indicating the correlation between the counter steering angle βan and the lateral force 2Ff may be stored in advance in the nonvolatile memory of the steering assistance unit 11.

The actual steering angle estimator 32 may calculate the actual steering angle βr by subtracting the counter steering angle βan from the steering angle β detected by the steering angle sensor 15 (βr=B-Ban). The actual steering angle βr may be read by the neutral point learning calculator 11b. Note that when the own vehicle M is traveling on the road surface having the cross slope θs, the camera unit 21 may be inclined together with the own vehicle M. Therefore, an image captured by the camera unit 21 may be hardly influenced by the cross slope θs.

<Neutral Point Learning Calculator 11b>

Figure 4A:
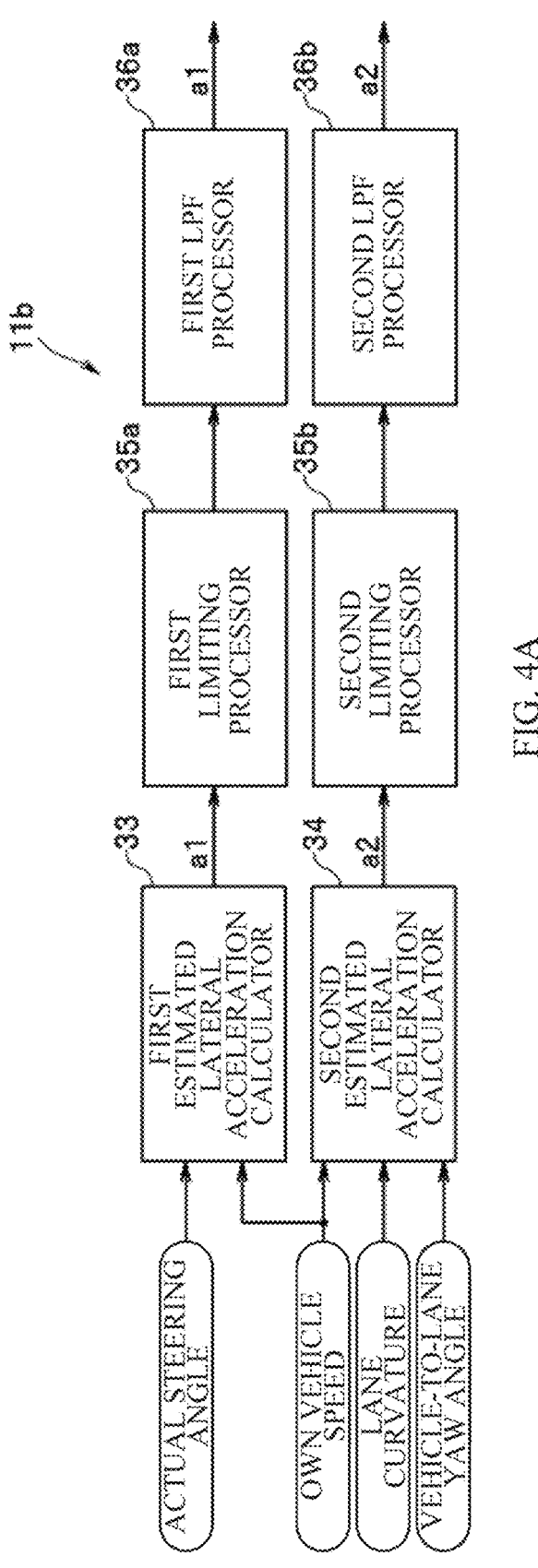
FIG. 4A is a block diagram illustrating a neutral point learning calculator.
Figure 4B:
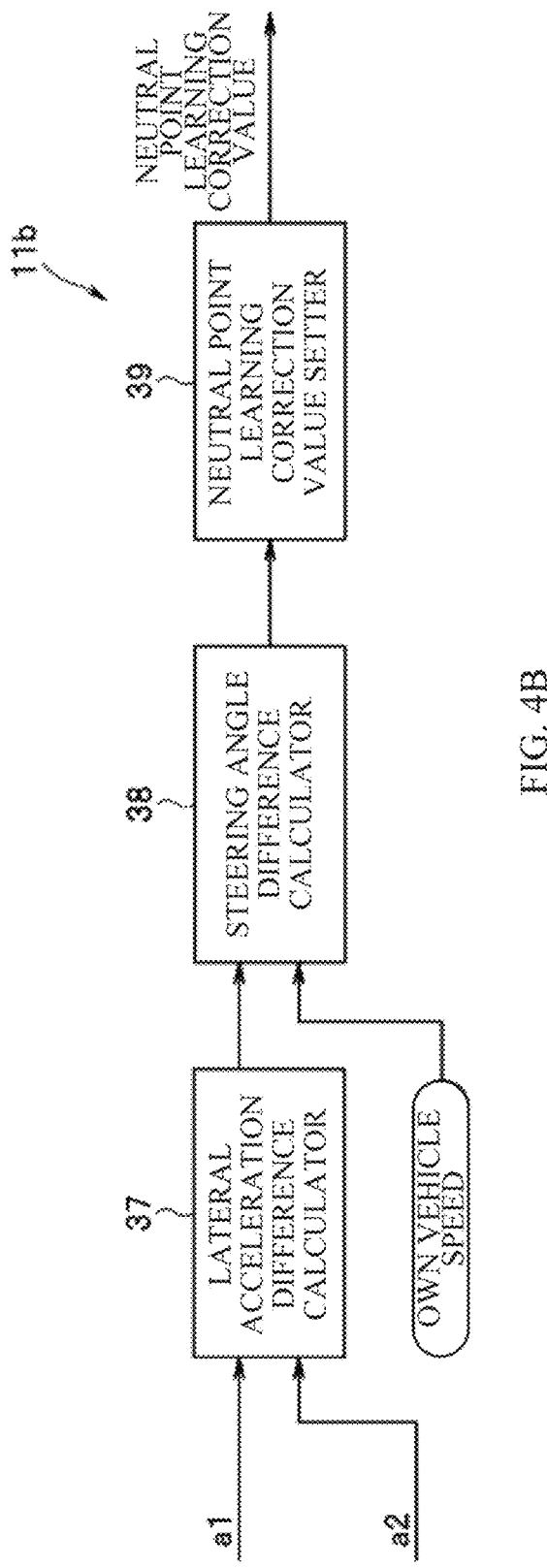
FIG. 4B is another block diagram illustrating the neutral point learning calculator.

As illustrated in FIGS. 4A and 4B, the neutral point learning calculator 11b may include a first estimated lateral acceleration calculator 33, a second estimated lateral acceleration calculator 34, a first limiting processor 35a, a second limiting processor 35b, a first low-pass filter (LPF) processor 36a, a second LPF processor 36b, a lateral acceleration difference calculator 37, a steering angle difference calculator 38, and a neutral point learning correction value setter 39.

In some embodiments, the first estimated lateral acceleration calculator 33 may set a turning curvature 1/Rm (1/m) (see FIG. 5) of the own vehicle M based on the actual steering angle βr and the own vehicle speed V with reference to a curvature conversion map. In the curvature conversion map, the turning curvature 1/Rm (1/m) may be stored that has been determined for each vehicle model based on the actual steering angle βr and the own vehicle speed V by a method such as a simulation. In some embodiments, the first estimated lateral acceleration calculator 33 may calculate a first estimated lateral acceleration a1 by multiplying the turning curvature 1/Rm by square of the own vehicle speed $$V\left(V^2\left((\text{m/s})^2\right)\right)\left(a1 = (1/Rm)\cdot V^2\left((\text{m/s})^2\right)\right).$$

In some embodiments, the second estimated lateral acceleration calculator 34 may calculate a lane yaw rate ωl by multiplying the own vehicle speed V detected by the vehicle speed sensor 13 by the lane curvature 1/Rl recognized by the camera unit 21 (ωl=(1/Rl)·V (rad/s)). Further, in some embodiments, the second estimated lateral acceleration calculator 34 may estimate a vehicle-to-lane yaw rate ωψ (rad/s) (see FIG. 5) by differentiating a vehicle-to-lane yaw angle ψ recognized by the camera unit 21. The vehicle-to-lane yaw angle ψ may indicate a direction of the own vehicle M with respect to the lane. In some embodiments, the second estimated lateral acceleration calculator 34 may add the lane yaw rate ωl and the vehicle-to-lane yaw rate ωψ together (ωl+ωψ). In some embodiments, the second estimated lateral acceleration calculator 34 may calculate a second estimated lateral acceleration a2 by multiplying the resultant value (ωl+ωψ) by the own vehicle speed $$V\left(a2 = (\omega1 + \omega\psi)\cdot V\left(\text{m/s}^2\right)\right).$$

The first limiting processor 35a may perform a limiting process on the first estimated lateral acceleration a1 determined by the first estimated lateral acceleration calculator 33 and thereby suppress an excessively large unnecessary output. The second limiting processor 35b may perform a limiting process on the second estimated lateral acceleration a2 determined by the second estimated lateral acceleration calculator 34 and thereby suppress an excessively large unnecessary output.

The first LPF processor 36a may remove a high frequency noise component of a predetermined cutoff frequency or higher from the first estimated lateral acceleration a1 that has been subjected to the limiting process by the first limiting processor 35a. The second LFP processor 36b may remove a high frequency noise component of a predetermined cutoff frequency or higher from the second estimated lateral acceleration a2 that has been subjected to the limiting process by the second limiting processor 35b.

The lateral acceleration difference calculator 37 may calculate a lateral acceleration difference Δa based on a difference between the first estimated lateral acceleration a1 and the second estimated lateral acceleration a2 (Δa=a1−a2). Further, the lateral acceleration difference calculator 37 may perform a low-pass filter (LPF) process with a low cutoff frequency on the lateral acceleration difference Δa and simply extract an offset component.

The lateral acceleration difference Δa may be the difference between the first estimated lateral acceleration a1 based on the turning curvature 1/Rm and the second estimated lateral acceleration a2 based on the lane curvature 1/R1. The turning curvature 1/Rm may be determined based on the actual steering angle βr. The lane curvature 1/R1 may be recognized based on the image captured by the camera unit 21.

Figure 9:
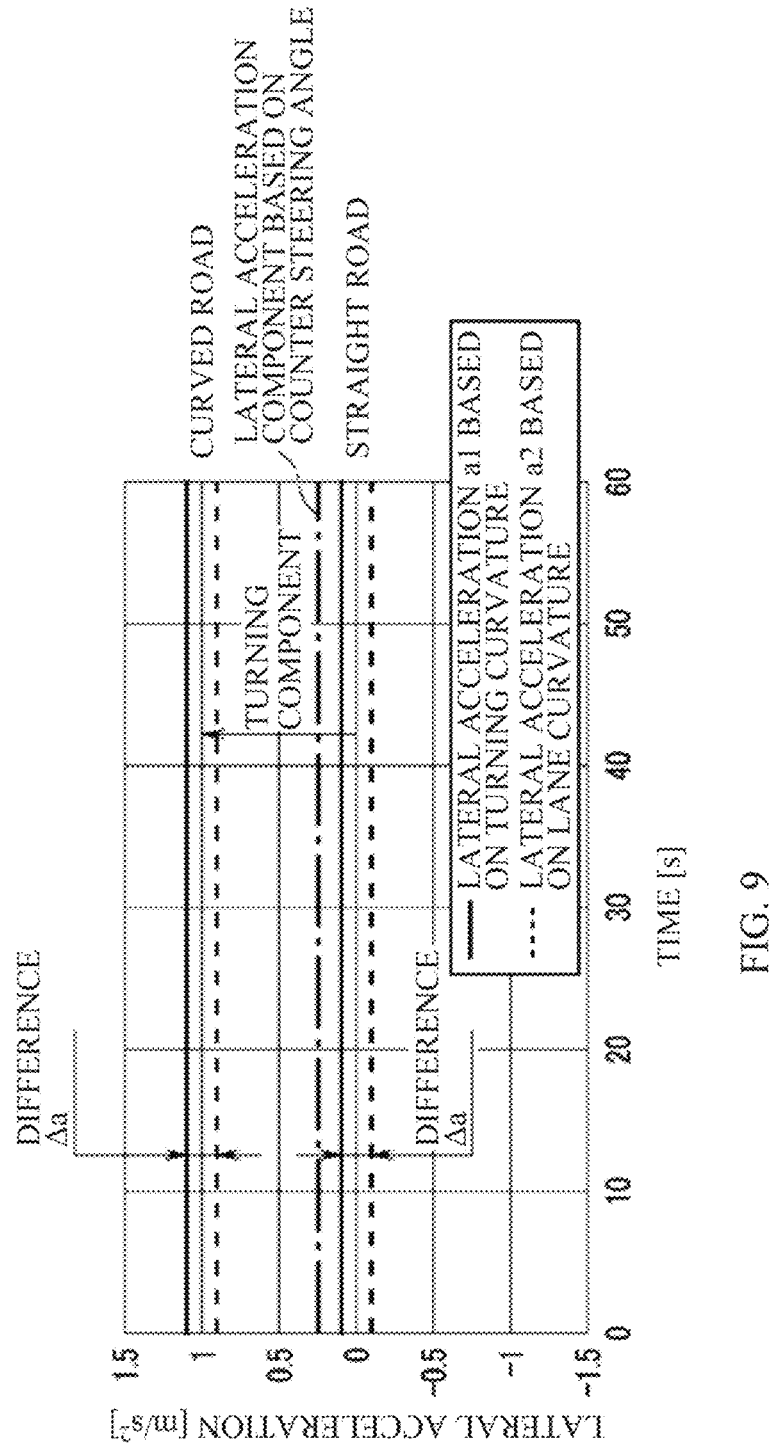
FIG. 9 is a time chart illustrating a lateral acceleration based on the steering angle and a lateral acceleration based on the lane curvature in each of a case where the own vehicle is traveling on the straight road and a case where the own vehicle is traveling on the curved road.

The actual steering angle βr may be a resultant of removing a component of the counter steering angle βan that offsets the cross slope θs from the steering angle β detected by the steering angle sensor 15. Referring to FIG. 9, the first estimated lateral acceleration a1 calculated based on the actual steering angle βr and indicated by a solid line may not include a lateral acceleration component based on the counter steering angle βan indicated by a dashed-dotted line. The second estimated lateral acceleration a2 indicated by a dashed line may be based on the lane curvature 1/R1 recognized from the image captured by the camera unit 21, and may not include a factor related to the cross slope θs.

Accordingly, as illustrated in FIG. 9, the lateral acceleration difference Δa itself may have a constant value regardless of whether the own vehicle M is traveling on the straight road or the curved road. When the own vehicle M is traveling on the curved road, a lateral acceleration corresponding to a curve curvature may be simply added, as an offset amount, to each of the first estimated lateral acceleration a1 and the second estimated lateral acceleration a2. Note that in FIG. 9, a lateral acceleration when the own vehicle M is traveling on a left curved road may be indicated by a positive value, and a lateral acceleration when the own vehicle M is traveling on a right curved road may be indicated by a negative value.

The steering angle difference calculator 38 may first calculate a steering angle difference Δβ based on the lateral acceleration difference Δa. For example, the steering angle difference calculator 38 may calculate a curvature difference Δ1/R by dividing the lateral acceleration difference Δa (m/S²) by the square of the own vehicle speed V (V² ((m/s)²)) (Δ1/R=Δa/V² (1/m)). Thereafter, the steering angle difference calculator 38 may set a steering angle difference Δβ (rad) based on the curvature difference Δ1/R and the own vehicle speed V with reference to a steering angle conversion map. In the steering angle conversion map, the steering angle difference Δβ may be stored that has been obtained for each vehicle model based on the curvature difference Δ1/R and the own vehicle speed V by a method such as a simulation.

The neutral point learning correction value setter 39 may convert the steering angle difference Δβ (rad) set by the steering angle difference calculator 38 into a steering angle difference Δβ (deg). The neutral point learning correction value setter 39 may set the steering angle difference Δβ in degree after the conversion to a neutral point learning correction value kβ (deg) (kβ←−Δβ).

The neutral point learning correction value kβ set by the neutral point learning correction value setter 39 may be read by the steering assistance controller 11c. The steering assistance controller 11c may incorporate a factor of the neutral point learning correction value kβ into the steering angle instruction value when outputting the steering angle instruction value to the EPS motor 5. Incorporating the factor of the neutral point learning correction value kβ into the steering angle instruction value may allow for instant correction of the deviation of the neutral point in each of the sensors including, without limitation, the steering angle sensor 15 involved in the steering angle control.

This helps to allow the steering assistance controller 11c to give, to the EPS motor 5, an instruction related to the steering angle with high accuracy based on the steering angle neutral point as a reference. This helps to reduce a time of convergence in the feedback control to allow the own vehicle M to travel in accordance with the lane curvature 1/R1 set based on the image captured by the camera unit 21.

The cross slope θs may be calculated based on the own vehicle speed V, the yaw rate γ, and the lateral acceleration αγ, as indicated by the foregoing expression (1). In addition, the lateral acceleration difference Δa may be calculated without the factor related to the cross slope θs also when the own vehicle M is traveling on a traveling path having the cross slope θs. Because the factor of the neutral point learning correction value kβ is incorporated into the steering angle instruction value outputted from the steering assistance controller 11c, the deviation of the cross slope θs calculated by the expression (1) may also be corrected as a result.

Note that a device serving as the "traveling environment recognizer" is not limited to the camera unit 21. In some embodiments, the device serving as the "traveling environment recognizer" may be a monocular camera, a light detection and ranging (LiDAR), a combination of the monocular camera and the LiDAR, or any other device, as long as the device is configured to recognize the lane lines defining, in the left-right direction, the lane on which the own vehicle M is traveling.

According to the driver assistance apparatus 10 according to one embodiment of the disclosure, the neutral point learning calculator 11b calculates the first estimated lateral acceleration a1 based on the steering angle β and the own vehicle speed V. Thereafter, the neutral point learning calculator 11b calculates the second estimated lateral acceleration a2 of the own vehicle M based on the own vehicle speed V and the lane curvature 1/R1 recognized by the device serving as the traveling environment recognizer, and calculates the lateral acceleration difference Δa based on the difference between the first estimated lateral acceleration a1 and the second estimated lateral acceleration a2. The neutral point learning calculator 11b calculates the steering angle difference Δβ based on the lateral acceleration difference Δa and the own vehicle speed V, and may set the steering angle difference Δβ to the neutral point learning correction value kβ by which the neutral point of the steering angle instruction value to be outputted from the steering assistance controller 11c is corrected. This helps to perform learning the neutral point of the steering angle to be performed not only when the own vehicle M is traveling on the straight road but also when the own vehicle M is traveling on the curved road, and to reduce the time of convergence in the feedback control to allow the own vehicle M to travel along the target traveling path.

Although some embodiments of the disclosure have been described in the foregoing by way of example with reference to the accompanying drawings, the disclosure is by no means limited to the embodiments described above. It should be appreciated that modifications and alterations may be made by persons skilled in the art without departing from the scope as defined by the appended claims. The disclosure is intended to include such modifications and alterations in so far as they fall within the scope of the appended claims or the equivalents thereof. The limitations in the claims are to be interpreted broadly based on the language employed in the claims and not limited to examples described in this specification or during the prosecution of the application, and the examples are to be construed as non-exclusive.

As used in this specification and the appended claims, the singular forms "a," "an," and "the" include, especially in the context of the claims, are to be construed to cover both the singular and the plural, unless otherwise indicated herein or clearly contradicted by context.

Throughout this specification and the appended claims, unless the context requires otherwise, the terms "comprise", "include", "have", and their variations are to be construed to cover the inclusion of a stated element, integer, or step but not the exclusion of any other non-stated element, integer, or step.

The use of the terms first, second, etc. do not denote any order or importance, but rather the terms first, second, etc. are used to distinguish one element from another.

The term "substantially", "approximately", "about", and its variants having the similar meaning thereto are defined as being largely but not necessarily wholly what is specified as understood by one of ordinary skill in the art.

The term "disposed on/provided on/formed on" and its variants having the similar meaning thereto as used herein refer to elements disposed directly in contact with each other or indirectly by having intervening structures therebetween.

The steering assistance unit 11 illustrated in FIG. 2 is implementable by circuitry including at least one semiconductor integrated circuit such as at least one processor (e.g., a central processing unit (CPU)), at least one application specific integrated circuit (ASIC), and/or at least one field programmable gate array (FPGA). At least one processor is configurable, by reading instructions from at least one machine readable non-transitory tangible medium, to perform all or a part of functions of the steering assistance unit 11 illustrated in FIG. 2. Such a medium may take many forms, including, but not limited to, any type of magnetic medium such as a hard disk, any type of optical medium such as a CD and a DVD, any type of semiconductor memory (i.e., semiconductor circuit) such as a volatile memory and a non-volatile memory. The volatile memory may include a DRAM and a SRAM, and the nonvolatile memory may include a ROM and a NVRAM. The ASIC is an integrated circuit (IC) customized to perform, and the FPGA is an integrated circuit designed to be configured after manufacturing in order to perform, all or a part of the functions of the steering assistance unit 11 illustrated in FIG. 2.

The invention claimed is:

1. A driver assistance apparatus for a vehicle, the driver assistance apparatus comprising:
   a steering angle detector configured to detect a steering angle of the vehicle;
   a vehicle speed detector configured to detect a vehicle speed of the vehicle;
   a traveling environment recognizer configured to recognize a traveling environment in front of the vehicle;
   a steering driver configured to steer left and right steered wheels of the vehicle;
   a steering assistance controller configured to output a steering angle instruction value to the steering driver and allow the vehicle to travel in accordance with a lane curvature recognized by the traveling environment recognizer; and
   a neutral point learning calculator configured to set a neutral point learning correction value by which a neutral point of the steering angle instruction value is to be corrected, the steering angle instruction value being to be outputted from the steering assistance controller, wherein the neutral point learning calculator comprises a first estimated lateral acceleration calculator configured to calculate a first estimated lateral acceleration that is to act on the vehicle, based on the steering angle and the vehicle speed detected by the vehicle speed detector, a second estimated lateral acceleration calculator configured to calculate a second estimated lateral acceleration that is to act on the vehicle, based on the vehicle speed detected by the vehicle speed detector and the lane curvature recognized by the traveling environment recognizer, a lateral acceleration difference calculator configured to calculate a lateral acceleration difference, based on a difference between the first estimated lateral acceleration calculated by the first estimated lateral acceleration calculator and the second estimated lateral acceleration calculated by the second estimated lateral acceleration calculator, a steering angle difference calculator configured to calculate a steering angle difference, based on the lateral acceleration difference calculated by the lateral acceleration difference calculator and the vehicle speed detected by the vehicle speed detector, and a neutral point learning correction value setter configured to set the steering angle difference calculated by the steering angle difference calculator to the neutral point learning correction value.

2. The driver assistance apparatus for the vehicle according to claim 1, further comprising:

a cross slope estimator configured to estimate a cross slope of a traveling lane; and an actual steering angle estimator configured to calculate an actual steering angle by subtracting a counter steering angle from the steering angle detected by the steering angle detector, the counter steering angle being against the cross slope when the vehicle travels on the traveling lane having the cross slope, wherein the first estimated lateral acceleration calculator is configured to calculate the first estimated lateral acceleration, based on the actual steering angle and the vehicle speed.

3. The driver assistance apparatus for the vehicle according to claim 2, wherein the first estimated lateral acceleration calculator is configured to calculate the first estimated lateral acceleration by setting, based on the actual steering angle and the vehicle speed, a turning curvature of the vehicle, and multiplying the turning curvature by square of the vehicle speed.

4. The driver assistance apparatus for the vehicle according to claim 2, further comprising:

a lateral acceleration detector configured to detect a lateral acceleration of the vehicle; and a yaw rate detector configured to detect a yaw rate of the vehicle, wherein the cross slope estimator is configured to calculate the cross slope, based on a value in which the lateral acceleration detected by the lateral acceleration detector is subtracted from a value in which the vehicle speed is multiplied by the yaw rate detected by the yaw rate detector.

5. The driver assistance apparatus for the vehicle according to claim 1, wherein the second estimated lateral acceleration calculator is configured to calculate the second estimated lateral acceleration by calculating a vehicle-to-lane yaw rate by multiplying the vehicle speed by the lane curvature, calculating a vehicle-to-lane yaw angle indicating a direction of the vehicle with respect to a lane, the direction being determined based on the traveling environment recognized by the traveling environment recognizer, and multiplying, by the vehicle speed, a value in which the lane yaw rate and the vehicle-to-lane yaw rate are added together.

6. A driver assistance apparatus for a vehicle, the driver assistance apparatus comprising:

a steering angle detector comprising a sensor, the steering angle detector being configured to detect a steering angle of the vehicle;

a vehicle speed detector comprising a sensor, the vehicle speed detector being configured to detect a vehicle speed of the vehicle;

a traveling environment recognizer comprising a camera, the traveling environment recognizer being configured to recognize a traveling environment in front of the vehicle;

a steering driver comprising a motor, the steering driver being configured to steer left and right steered wheels of the vehicle; and circuitry configured to perform a steering assistance control in which a steering angle instruction value is outputted to the steering driver and allow the vehicle to travel in accordance with a lane curvature recognized by the traveling environment recognizer, and perform a neutral point learning calculation in which a neutral point learning correction value is set, the neutral point learning correction value being a value by which a neutral point of the steering angle instruction value is to be corrected, wherein the circuitry is configured to, as the neutral point learning calculation, calculate a first estimated lateral acceleration that is to act on the vehicle, based on the steering angle and the vehicle speed detected by the vehicle speed detector, calculate a second estimated lateral acceleration that is to act on the vehicle, based on the vehicle speed detected by the vehicle speed detector and the lane curvature recognized by the traveling environment recognizer, calculate a lateral acceleration difference, based on a difference between the first estimated lateral acceleration and the second estimated lateral acceleration, calculate a steering angle difference, based on the lateral acceleration difference and the vehicle speed detected by the vehicle speed detector, and set the steering angle difference to the neutral point learning correction value.

* * * * *